US009883003B2

(12) United States Patent
Stott et al.

(10) Patent No.: US 9,883,003 B2
(45) Date of Patent: Jan. 30, 2018

(54) MEETING ROOM DEVICE CACHE CLEARING

(71) Applicant: Microsoft Technology Licensing, LLC, Redmond, WA (US)

(72) Inventors: Nathaniel Whitford Stott, Redmond, WA (US); Thaddeus Adam Scott, Seattle, WA (US); John Cole Bradley, Seattle, WA (US); Chad Michael Roberts, Snohomish, WA (US); Brianna Kelly Potvin, Seattle, WA (US); John Michael Sheehan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 107 days.

(21) Appl. No.: 14/642,482

(22) Filed: Mar. 9, 2015

(65) Prior Publication Data

US 2016/0269503 A1 Sep. 15, 2016

(51) Int. Cl.
*H04L 29/06* (2006.01)
*H04L 29/08* (2006.01)

(52) U.S. Cl.
CPC ........ *H04L 67/2852* (2013.01); *H04L 65/403* (2013.01); *H04L 65/4023* (2013.01)

(58) Field of Classification Search
CPC .... H04L 67/2852; H04L 65/403; H04L 67/22
USPC .......................... 709/204, 205, 206, 227, 231
See application file for complete search history.

(56) References Cited

U.S. PATENT DOCUMENTS

| | | | |
|---|---|---|---|
| 5,572,728 A | 11/1996 | Tada et al. | |
| 5,805,846 A * | 9/1998 | Nakajima | H04L 12/1813 709/205 |
| 7,428,000 B2 | 9/2008 | Cutler et al. | |
| 7,447,608 B1 | 11/2008 | Poston et al. | |
| 7,660,904 B2 | 2/2010 | Qureshi et al. | |
| 7,855,726 B2 | 12/2010 | Ferren et al. | |
| 8,433,751 B2 | 4/2013 | Burns et al. | |
| 8,514,263 B2 | 8/2013 | Periyannan et al. | |
| 8,731,299 B2 | 5/2014 | Hawkins et al. | |
| 8,739,046 B2 | 5/2014 | Sloyer et al. | |
| 8,767,032 B2 | 7/2014 | Rodman | |
| 2003/0103075 A1 | 6/2003 | Rosselot | |
| 2004/0141005 A1 | 7/2004 | Banatwala et al. | |
| 2004/0161080 A1 | 8/2004 | Digate et al. | |
| 2005/0033805 A1 * | 2/2005 | Fujiyama | H04M 3/567 709/204 |
| 2005/0044167 A1 * | 2/2005 | Kobayashi | G06Q 10/10 709/217 |
| 2005/0078172 A1 | 4/2005 | Harville et al. | |
| 2005/0132408 A1 | 6/2005 | Dahley et al. | |

(Continued)

OTHER PUBLICATIONS

"Webex Meeting Center User Guide"—Cisco, Jul. 2013 https://www.cisco.com/c/dam/en/us/td/docs/collaboration/meeting_center/wx_mc_host_ug.pdf.*

(Continued)

*Primary Examiner* — Randy Scott

(57) ABSTRACT

Meeting software on a meeting room device enables a meeting to be conducted. The meeting room device detects that a meeting has been terminated and, responsive to detecting that the meeting has been terminated, automatically deletes data associated with the meeting from multiple different locations.

20 Claims, 11 Drawing Sheets

(56) References Cited

U.S. PATENT DOCUMENTS

| | | | |
|---|---|---|---|
| 2006/0053194 A1 | 3/2006 | Schenider et al. | |
| 2007/0112926 A1 | 5/2007 | Brett et al. | |
| 2007/0185956 A1* | 8/2007 | Ogle | G06Q 10/10 709/204 |
| 2007/0188597 A1 | 8/2007 | Kenoyer | |
| 2007/0252001 A1 | 11/2007 | Kail et al. | |
| 2008/0088698 A1 | 4/2008 | Patel et al. | |
| 2009/0119246 A1 | 5/2009 | Kansal | |
| 2009/0179983 A1 | 7/2009 | Schindler | |
| 2009/0187549 A1 | 7/2009 | Samn | |
| 2009/0192845 A1 | 7/2009 | Gudipaty et al. | |
| 2009/0210491 A1 | 8/2009 | Thakkar et al. | |
| 2009/0222741 A1 | 9/2009 | Shaw et al. | |
| 2009/0244278 A1* | 10/2009 | Taneja | G06Q 10/10 348/143 |
| 2009/0287995 A1* | 11/2009 | Tsao | B66C 1/422 715/234 |
| 2010/0037151 A1 | 2/2010 | Ackerman et al. | |
| 2010/0228825 A1 | 9/2010 | Hegde et al. | |
| 2010/0235216 A1 | 9/2010 | Hehmeyer et al. | |
| 2010/0238500 A1* | 9/2010 | Teramoto | H04L 12/1822 358/1.15 |
| 2010/0245563 A1 | 9/2010 | Golovchinsky et al. | |
| 2010/0262925 A1 | 10/2010 | Liu et al. | |
| 2011/0264745 A1 | 10/2011 | Ferlitsch | |
| 2011/0307800 A1 | 12/2011 | Back et al. | |
| 2012/0166921 A1 | 6/2012 | Alexandrov et al. | |
| 2012/0191500 A1 | 7/2012 | Byrnes et al. | |
| 2012/0204120 A1 | 8/2012 | Lefar et al. | |
| 2012/0278408 A1 | 11/2012 | Seferian et al. | |
| 2012/0284640 A1 | 11/2012 | Sloyer et al. | |
| 2012/0293599 A1 | 11/2012 | Norlin et al. | |
| 2013/0063544 A1 | 3/2013 | Kanniappan et al. | |
| 2013/0106985 A1 | 5/2013 | Tandon et al. | |
| 2013/0110925 A1 | 5/2013 | Wessling et al. | |
| 2013/0113804 A1 | 5/2013 | Ferman et al. | |
| 2013/0173700 A1 | 7/2013 | Burris et al. | |
| 2013/0191719 A1 | 7/2013 | Underhill et al. | |
| 2013/0325972 A1 | 12/2013 | Boston et al. | |
| 2014/0033067 A1 | 1/2014 | Pittenger et al. | |
| 2014/0033073 A1 | 1/2014 | Pegg | |
| 2014/0081693 A1 | 3/2014 | Abuelsaad et al. | |
| 2014/0136627 A1 | 5/2014 | Epstein | |
| 2014/0139426 A1 | 5/2014 | Kryze et al. | |
| 2014/0189005 A1 | 7/2014 | Dinh-Trong et al. | |
| 2014/0208211 A1 | 7/2014 | Luo et al. | |
| 2014/0280931 A1* | 9/2014 | Braun | H04L 63/10 709/225 |
| 2015/0026595 A1 | 1/2015 | Lu et al. | |
| 2015/0033146 A1 | 1/2015 | Wu et al. | |
| 2015/0067026 A1 | 3/2015 | Christiansen et al. | |
| 2015/0067552 A1 | 3/2015 | Leorin et al. | |
| 2015/0142800 A1 | 5/2015 | Thapliyal | |
| 2015/0149540 A1 | 5/2015 | Barker et al. | |
| 2016/0065625 A1 | 3/2016 | Ouyang et al. | |
| 2016/0073052 A1 | 3/2016 | Wang et al. | |
| 2016/0094593 A1 | 3/2016 | Priya | |
| 2016/0140508 A1 | 5/2016 | Ossia et al. | |
| 2016/0269254 A1 | 9/2016 | Forney et al. | |
| 2016/0269450 A1 | 9/2016 | Tondepu et al. | |
| 2016/0269451 A1 | 9/2016 | Houchen et al. | |
| 2016/0299671 A1 | 10/2016 | An et al. | |

OTHER PUBLICATIONS

"International Search Report and Written Opinion", Application No. PCT/US2016/021285, dated May 19, 2016, 11 pages.

"Chromebox Device for Meetings: Wipe and Re-Enroll a Device", Retrieved From: <https://support.google.com/chromeboxformeetings/answer/4580158?hl=en> Feb. 10, 2015, 2 pages.

"Crestron RL", Available at: <http://www.crestron.com/downloads/pdf/product_brochures/crestron_rl_brochure.pdf>, Aug. 2013, 20 pages.

"Drum Features", NetDev Ltd.; retrieved Feb. 9, 2015, Feb. 9, 2015, 8 pages.

"Elluminate to WebEx Transition", e-Learning & Instructional Support Oakland University; Creative Commons License, Apr. 1, 2014, 6 pages.

"Epson MeetingMate EB-1430Wi", retrieved from http://www.epson.co.nz/products/projector/EB-1430Wi.asp?groupid=70 on Feb. 10, 2015, 6 pages.

"Getting Started Guide—BlueJeans", Available at: <https://bluejeans.app.box.com/GettingStartedGuide>, Jan. 4, 2015, 59 pages.

"Getting Started with SunForum", Sun Microsystems, Inc., Jun. 26, 2008, 4 pages.

"Lync 2010—Online Meeting & Conference Call Guide", Version:00; Alteva; retrieved from www.alteva.com on Feb. 9, 2015, 53 pages.

"Polycom CX8000", Available at: <http://support.polycom.com/global/documents/support/user/products/voice/qts_cx_8000_us.pdf>, Aug. 2014, 2 pages.

"Polycom Solution Portfolio Summary", Polycom Video Solutions, Jul. 5, 2014, 8 pages.

"Polycom UC Board", Data Sheet; Transforming Ordinary Surfaces into Virtual Whiteboards, Jul. 5, 2014, 2 pages.

"Privacy Supplement for Microsoft Lync 2013", retrieved Feb. 10, 2015, Oct. 2014, 19 pages.

"Quick Start Card—Participating in AT&T Connect® Conference on Your Android® Tablet", Version 3.7; AT&T Connect®, Nov. 2014, 6 pages.

"SMART Room System", Retrieved From: <http://smarttech.com/smartroom> Feb. 10, 2015, Apr. 3, 2013, 2 pages.

"Using WNYRIC Unified Communications Online Meetings from a Web Browser", Available at: <http://www.e1b.org/Portals/0/Files%20by%20Division/Technology/Unified%20Communications%20Services/UC%20Web%20Browser%20Meetings.pdf>, 2014, 4 pages.

"WebEx Meeting Center User Guide", Cisco Webex; for Hosts, Presenters, and Participants; www.webex.com, Oct. 20, 2014, 414 pages.

"Non-Final Office Action", U.S. Appl. No. 14/642,522, dated Nov. 10, 2016, 10 pages.

"Non-Final Office Action", U.S. Appl. No. 14/642,364, dated Dec. 1, 2016, 8 pages.

"Final Office Action", U.S. Appl. No. 14/642,522, dated Mar. 9, 2017, 12 pages.

"Non-Final Office Action", U.S. Appl. No. 14/642,441, dated Jan. 19, 2017, 20 pages.

"Second Written Opinion", Application No. PCT/US2016/021285, dated Jan. 31, 2017, 5 pages.

"Advisory Action", U.S. Appl. No. 14/642,522, dated Jun. 29, 2017, 3 pages.

"Final Office Action", U.S. Appl. No. 14/642,364, dated Jul. 3, 2017, 14 pages.

"Final Office Action", U.S. Appl. No. 14/642,441, dated Aug. 28, 2017, 23 pages.

"International Preliminary Report on Patentability", Application No. PCT/US2016/021285, dated May 24, 2017, 11 pages.

"Non-Final Office Action", U.S. Appl. No. 14/642,522, dated Sep. 1, 2017, 15 pages.

"Non-Final Office Action", U.S. Appl. No. 14/642,364, dated Sep. 28, 2017, 13 pages.

\* cited by examiner

MEETING ROOM DEVICE CACHE CLEARING

BACKGROUND

Meeting software enables individuals to conduct group meetings in efficient ways. For example, the group of individuals can meet in a meeting room and, through the use of meeting software, can conduct a meeting, share resources, conference other remote participants into the meeting, and the like. As meeting software evolves, challenges remain to provide improved meeting software that enables participants to even more efficiently conduct meetings in a safe and secure manner.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In at least some embodiments, meeting software on a meeting room device enables a meeting summary to be generated and sent to individuals associated with a meeting. The meeting summary may be triggered by a user, such as a meeting administrator. Alternately or additionally, the meeting summary may be automatically triggered and sent to the individuals associated with the meeting. In at least some embodiments, the meeting summary can include a timeline of events that occurred throughout the meeting. In addition, the meeting summary can include content from the meeting and/or mechanisms to enable content from the meeting to be accessed by the recipients of the meeting summary.

In at least some embodiments, the meeting summary can be provided at the end of the meeting. Various options can enable the meeting summary to be sent to different groups of individuals. These groups can include, by way of example and not limitation, all invited participants or checked-in participants. In addition, various techniques can be utilized to identify local meeting participants. These techniques can include, by way of example and not limitation, facial detection, detectable badges, and the like.

In yet other embodiments, the meeting room device clears its cache to permanently remove details of the meeting. The details can include, by way of example and not limitation, participant lists, websites visited, notes shared, messages shared, and the like. In at least some embodiments, content associated with the meeting is stored in a restricted number of locations. During or after a particular meeting, these locations are accessed and the content cached therein is permanently deleted so that it is non-recoverable.

In at least some embodiments, while a meeting is being conducted, at least some resources of the meeting room device are not shared with other participating computing devices until the resources are the subject of an interaction. Once the interaction occurs, and the resource is automatically shared with the participating computing devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

In at least some embodiments, meeting software on a meeting room device enables a meeting summary to be generated and sent to individuals associated with a meeting. The meeting summary may be triggered by a user, such as a meeting administrator. Alternately or additionally, the meeting summary may be automatically triggered and sent to the individuals associated with the meeting. In at least some embodiments, the meeting summary can include a timeline of events that occurred throughout the meeting. In addition, the meeting summary can include content from the meeting and/or mechanisms to enable content from the meeting to be accessed by the recipients of the meeting summary.

In at least some embodiments, the meeting summary can be provided at the end of the meeting. Various options can enable the meeting summary to be sent to different groups of individuals. These groups can include, by way of example and not limitation, all invited participants or checked-in participants. In addition, various techniques can be utilized to identify local meeting participants. These techniques can include, by way of example and not limitation, facial detection, detectable badges, and the like.

In yet other embodiments, the meeting room device clears its cache to permanently remove details of the meeting. The details can include, by way of example and not limitation, participant lists, websites visited, notes shared, messages shared, and the like. In at least some embodiments, content associated with the meeting is stored in a restricted number of locations. During or after a particular meeting, these locations are accessed and the content cached therein is permanently deleted so that it is non-recoverable.

In at least some embodiments, while a meeting is being conducted, at least some resources of the meeting room device are not shared with other participating computing devices until the resources are the subject of an interaction. Once the interaction occurs, and the resource is automatically shared with the participating computing devices.

In the following discussion, an example environment is first described that is operable to employ the techniques described herein. The techniques may be employed in the example environment, as well as in other environments.

Example Environment

Figure 1:
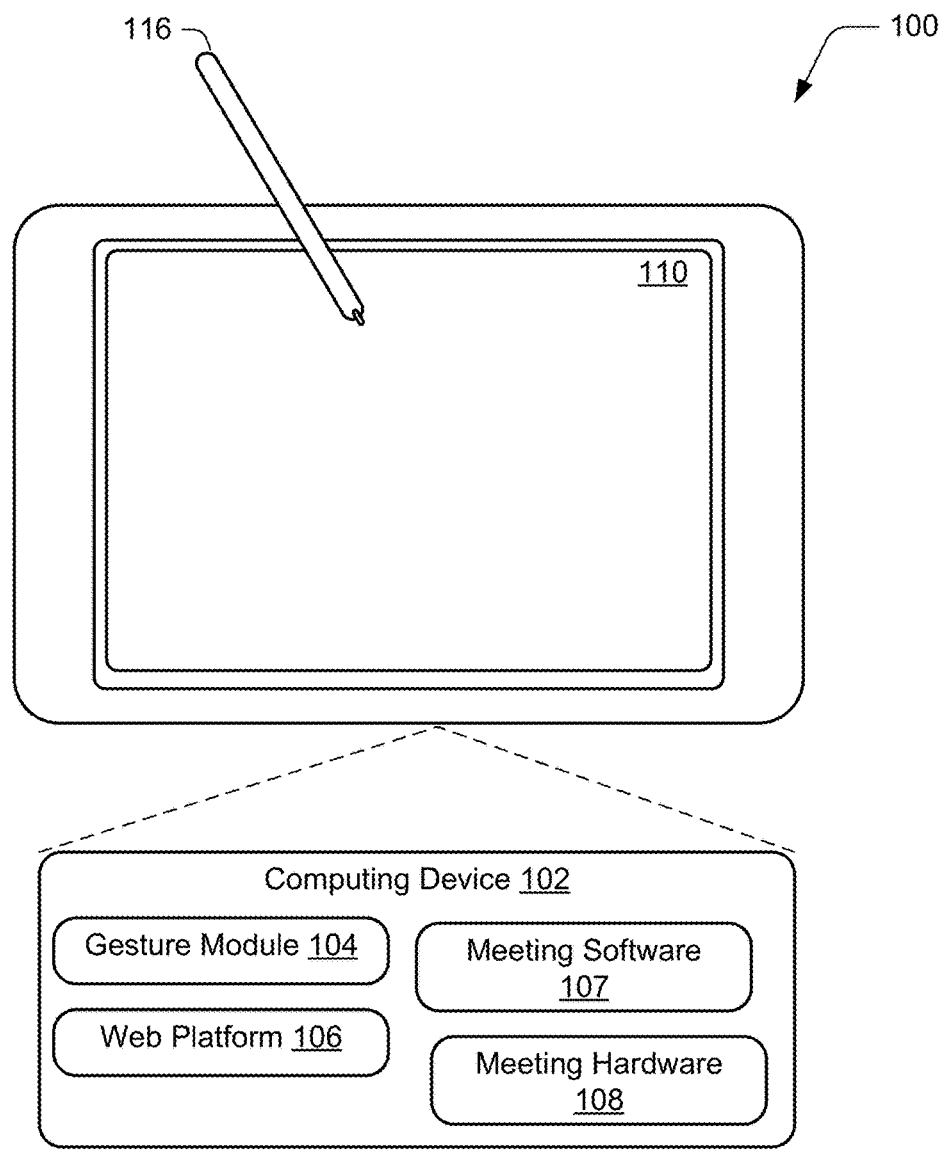
FIG. 1 is an illustration of an example meeting room device in accordance with one or more embodiments.

FIG. 1 is an illustration of an environment 100 in an example implementation that is operable to employ the techniques as described herein. The illustrated environment 100 includes an example of a meeting room device 102 that may be configured in a variety of ways. In this example, meeting room device 102 represents a computing device that is utilized to plan and conduct a meeting. The meeting room device 102 typically resides in a meeting room, conference room, or in an open area in which many different types of meetings can take place. As such, meeting room device 102 can have what can be considered as a "communal" nature. This means that the meeting room device can be used by various different groups to conduct their meetings. These various different meetings can be unrelated to each other such that content that is the subject of one meeting may not be relevant to content that is the subject of another meeting.

Figure 3:
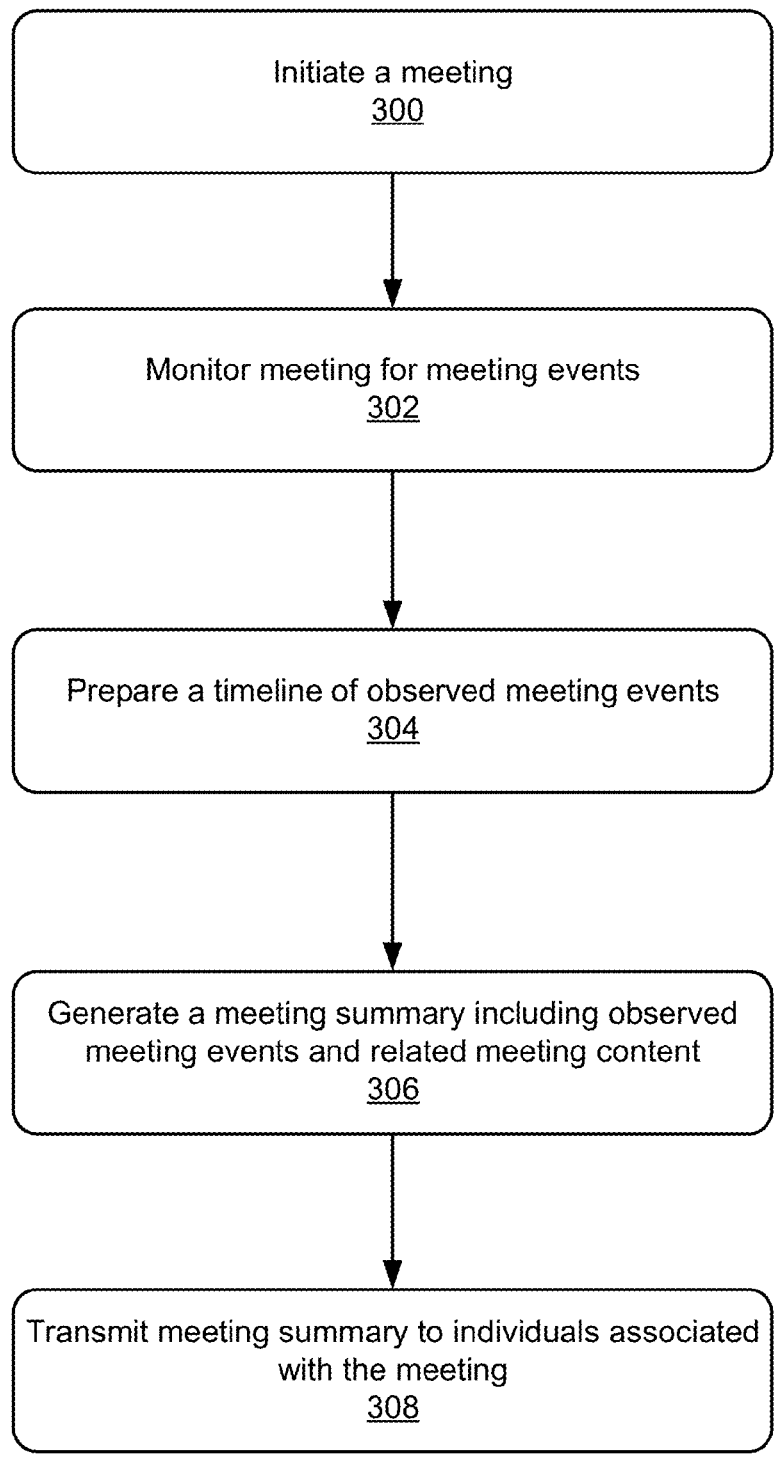
FIG. 3 is a flow diagram that describes steps in a method in accordance with one or more embodiments.

The meeting room device 102 may be configured as a traditional computer (e.g., a desktop personal computer, laptop computer, and so on), a mobile station, a wireless phone, a netbook, a handheld device, and so forth as further described in relation to FIG. 3. Thus, the meeting room device 102 may range from full resource devices with substantial memory and processor resources (e.g., personal computers) to a low-resource device with limited memory and/or processing resources. The meeting room device 102 also includes software that causes the meeting room device 102 to perform one or more operations as described below.

In at least some embodiments, the meeting room device 102 is a large form factor device that provides a canvas for idea collaboration, as will become apparent below.

Meeting room device 102 can include, by way of example and not limitation, a number of different components including a gesture module 104, a web platform 106, meeting software 107, and meeting hardware 108.

The gesture and module 104 is operational to provide gesture functionality. The gesture module 104 can be implemented in connection with any suitable type of hardware, software, firmware or combination thereof. In at least some embodiments, the gesture module 104 is implemented in software that resides on some type of computer-readable storage medium examples of which are provided below.

Gesture module 104 is representative of functionality that recognizes gestures that can be performed by one or more fingers, and causes operations to be performed that correspond to the gestures. The gestures may be recognized by module 104 in a variety of different ways. For example, the gesture module 104 may be configured to recognize a touch input, such as a finger of a user's hand as proximal to display device 110 of the meeting room device 102 using touchscreen functionality.

It is to be appreciated and understood that a variety of different types of gestures may be recognized by the gesture module 104 including, by way of example and not limitation, gestures that are recognized from a single type of input (e.g., touch gestures such as the previously described drag-and-drop gesture) as well as gestures involving multiple types of inputs. For example, module 104 can be utilized to recognize single-finger gestures and bezel gestures, multiple-finger/same-hand gestures and bezel gestures, and/or multiple-finger/different-hand gestures and bezel gestures.

For example, the meeting room device 102 may be configured to detect and differentiate between a touch input (e.g., provided by one or more fingers of the user's hand 108) and a stylus or pen input (e.g., provided by a stylus 116). The differentiation may be performed in a variety of ways, such as by detecting an amount of the display device 110 that is contacted by the finger of the user's hand 108 versus an amount of the display device 110 that is contacted by the stylus 116.

Thus, the gesture module 104 may support a variety of different gesture techniques through recognition and leverage of a division between stylus and touch inputs, as well as different types of touch inputs.

The web platform 106 is a platform that works in connection with content of the web, e.g. public content. A web platform 106 can include and make use of many different types of technologies such as, by way of example and not limitation, URLs, HTTP, REST, HTML, CSS, JavaScript, DOM, and the like. The web platform 106 can also work with a variety of data formats such as XML, JSON, and the like. Web platform 106 can include various web browsers, web applications (i.e. "web apps"), and the like. When executed, the web platform 106 allows the computing device to retrieve web content such as electronic documents in the form of webpages (or other forms of electronic documents, such as a document file, XML file, PDF file, XLS file, etc.) from a Web server and display them on the display device 110. It should be noted that meeting room device 102 could be any computing device that is capable of displaying Web pages/documents and connect to the Internet.

Meeting software 107 is representative of software that enables meetings to be conducted using various features which can include, by way of example and not limitation, instant messaging, Voice Over IP, video conferencing, and the like. The meeting software can also include such things as a cloud-based whiteboard tool that enables meeting participants to write upon the display device 110. The meeting software operates as described above and below.

Meeting hardware 108 is representative of hardware that enables meetings to be conducted as described above and below. The hardware can include, by way of example and not limitation, built-in sensors to help the meeting room device wakeup when a person is in close proximity and track a person's movement so that one or more cameras (e.g., 1080p cameras on each side of the meeting room device) can follow the person. In addition, the meeting hardware 108 can work in concert with the meeting software 107 to provide meeting starts using a single touch. The hardware and software of the meeting room device can also allow participants to share content wirelessly, thus making meetings engaging and productive. The meeting hardware 108 can also include a built-in microphone array.

Figure 2:
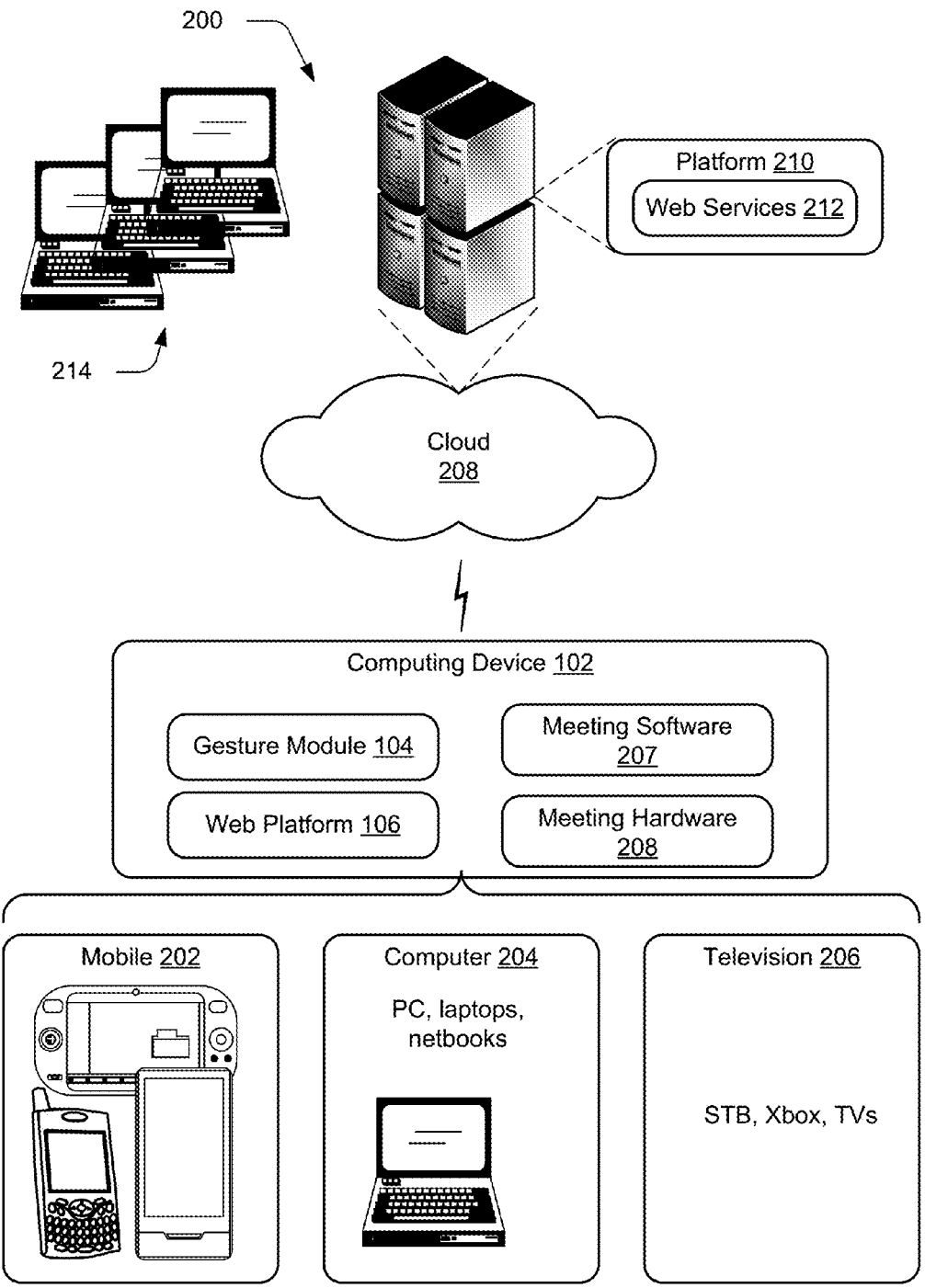
FIG. 2 is an illustration of an example environment in accordance with one or more embodiments.

FIG. 2 illustrates an example system 200 showing the components of FIG. 1, e.g., meeting software 107 and meeting hardware 108, as being implemented in an environment where multiple devices are interconnected through a central computing device. The meeting software 107 and meeting hardware 108 can enable meetings to be conducted using various features which can include, by way of example and not limitation, instant messaging, Voice Over IP, video conferencing, whiteboard functionality, content sharing and the like.

The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the meeting room device 102 may be configured in a variety of different ways, such as for mobile 202, computer 204, and television 206 uses. Each of these configurations has a generally corresponding screen size and thus the meeting room device 102 may be configured as one of these device classes in this example system 200. For instance, the meeting room device 102 may assume the mobile 202 class of device which includes mobile telephones, music players, game devices, and so on. The meeting room device 102 may also assume a computer 204 class of device that includes personal computers, laptop computers, netbooks, tablets, large form factor devices, and so on. The television 206 configuration includes configurations of device that involve display in a casual environment, e.g., televisions, set-top boxes, game consoles, and so on. Thus, the techniques described herein may be supported by these various configurations of the meeting room device 102 and are not limited to the specific examples described in the following sections.

As described above, meeting room device 102 includes meeting software 107 that operates as described above and below.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the meeting room device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the meeting room device 102 via the Internet or other networks. For example, aspects of the meeting software 107 may be implemented in part on the meeting room device 102 as well as in a distributed fashion via platform 210 that supports web services 212.

In addition, system 200 can include one or more remote computing devices 214 associated with remote participants who can participate in a meeting organized and conducted through meeting room device 102. Each of the remote computing devices 214 can execute a meeting client that enables communication with meeting software 107.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

For example, the computing device may also include an entity (e.g., software) that causes hardware or virtual machines of the computing device to perform operations, e.g., processors, functional blocks, and so on. For example, the computing device may include a computer-readable medium that may be configured to maintain instructions that cause the computing device, and more particularly the operating system and associated hardware of the computing device to perform operations. Thus, the instructions function to configure the operating system and associated hardware to perform the operations and in this way result in transformation of the operating system and associated hardware to perform functions. The instructions may be provided by the computer-readable medium to the computing device through a variety of different configurations.

One such configuration of a computer-readable medium is a signal bearing medium and thus is configured to transmit the instructions (e.g., as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

In the discussion that follows, a section entitled "Meeting Summaries" describes aspects of meeting summaries in accordance with one or more embodiments. Next, a section entitled "In-Room Participant" describes aspects of in-room meeting participants in connection with an example meeting room device. Following this, a section entitled "Automatic Resource Sharing" describes how resources can be automatically shared in accordance with one or more embodiments. Next, a section entitled "Meeting Room Device Cache Clearing" describes how a meeting room device's cash can be automatically cleared in accordance with one or more embodiments. Last, a section entitled "Example Device" describes aspects of an example device that can be utilized to implement one or more embodiments.

Having considered an example operating environment, consider now a discussion of meeting summaries and how meeting summaries can be created and shared.

Meeting Summaries

In at least some embodiments, meeting software on a meeting room device enables a meeting summary to be generated and sent to individuals associated with a meeting. The meeting summary may be triggered by a user, such as a meeting administrator. Alternately or additionally, the meeting summary may be automatically triggered and sent to the individuals associated with the meeting. In at least some embodiments, the meeting summary can include a timeline of events that occurred throughout the meeting. In addition, the meeting summary can include content from the meeting and/or mechanisms to enable content from the meeting to be accessed by the recipients of the meeting summary.

Typically, in the past, meetings have been very static and constitute static moments in time. For example, once a meeting invite is sent to various participants, it typically does not change or evolve. It represents a simple static piece of information that does not persist as the lifecycle of the meeting proceeds. As an example, if the meeting organizer sends out a meeting invite that includes an attached file, that file is attached to that particular invite and it simply resides only with that invite. It does not change or evolve.

The notion of a meeting summary is that the meeting summary evolves and adapts based on the activity of a particular meeting. So, for example, if at the end of the meeting the file has been changed or updated in some way, the updated file gets incorporated into the meeting summary which is then provided to individuals associated with the meeting. Effectively then, the meeting summary provides a kind of meeting object that is dynamic and alive rather than simply being a static moment in time.

In at least some embodiments, meeting summaries are automatically created and updated as the meeting evolves. This improves upon past approaches which required a manual process to build a collection of meeting content and information. A meeting summary is thus a fluid and automated process that records and captures moments in a particular meeting for subsequent distribution to others. The meeting summary is automatically populated and can be automatically sent or manually triggered to be sent to relevant recipients.

In operation, when the meeting is started, the meeting room device by way of the meeting software monitors events occurring within the meeting and creates a timeline of these events automatically. Alternately or additionally, monitoring events and creating a timeline of events can be performed by a server that facilitates conducting the meeting, e.g., a Skype for Business server. The events can include any types of events that can occur during a meeting. For example, events can include people who joined the meeting, webpages that were visited during the meeting, content that was shared during the meeting, whiteboard content that was created and/or shared, notebooks or laptops screens that were shared, files that were opened and/or modified (e.g. a PowerPoint file was opened and slide 19 was modified), typed notes, handwritten notes, annotated images and the like.

In addition, events can include content that is shared by not only in-room meeting participants, but remote participants as well. Further, content can come from and be shared from remote locations such as the Internet and various cloud-based locations.

As noted above, the meeting summary can include content from the meeting and/or mechanisms to enable content from the meeting to be accessed by the recipients of the meeting summary. For example, the meeting summary can reside as an automatically formulated e-mail that can include information associated with the meeting as well as various attachments such as files and the like. Alternately or additionally, as the meeting progresses and/or at the conclusion of the meeting, content associated with the meeting, such as files and the like, can be pushed to a remote location, such as a network-accessible location like the cloud, and the e-mail can include links to the various meeting content. That is, the e-mail can include at least one link to a location on a remote server that stores one or more pieces of meeting-related content.

As noted above, the meeting summary is generated and sent to individuals associated with a meeting. Individuals associated with the meeting can include, by way of example and not limitation, actual meeting participants who have joined the meeting either locally or remotely, or all of a particular meeting's invitees including those who may not necessarily have joined the meeting.

FIG. 3 is a flow diagram that describes steps in a method in accordance with one or more embodiments. The method can be implemented in connection with any suitable hardware, software, firmware, or combination thereof. In at least some embodiments, the method is implemented by a suitably-configured meeting room device executing meeting software.

Step 300 initiates a meeting. This step can be performed in any suitable way. For example, the meeting can be initiated through a single touch-related input received by the meeting room device. Other methods can be used to initiate the meeting. Step 302 monitors the meeting for meeting events. Examples of events are provided above. Such events can include monitoring for those individuals who joined the meeting. Individuals can include both local individuals and/or remote individuals. Local individuals might, for example, join a meeting by touching a particular avatar or icon on the meeting room device to indicate that they are present in the room. Alternately or additionally, local individuals might log onto the meeting in the meeting room by way of their laptop computer. Further, remote individuals might log onto the meeting using their own particular laptop computers.

As the meeting progresses, step 304 prepares a timeline of observed meeting events. For example, an observed meeting event might include the opening of a file, logging on to a particular website and consuming some of its content, creating a diagram using the meeting room device's whiteboard functionality and the like. At the conclusion of the meeting or contemporaneously during the pendency of the meeting, step 306 generates a meeting summary including observed meeting events and related meeting content. Step 308 then transmits the meeting summary to individuals associated with the meeting effective to enable access to meeting events and the related meeting content.

It is to be appreciated and understood that all of the steps of the described method can be performed automatically by the meeting software. Alternately or additionally, some aspects might be performed responsive to receiving user input. For example, transmission of the meeting summary as described in step 308 might be performed responsive to receiving user input to cause transmission of the meeting summary.

Having considered aspects of a meeting summary and its generation and dissemination amongst meeting participants, consider now the notion of an in-room participant and how the meeting software can enhance the services it provides through knowledge of who was in attendance at the meeting.

In-Room Participant

In various embodiments, individual participants can check into a particular meeting and, based upon being checked into the meeting, the meeting software can intelligently provide additional services and functionality for an enhanced user experience. For example, by checking individual participants into a meeting, the meeting software can indicate to remote participants who are not necessarily in the meeting room who is in attendance. In addition, by having individual users check into the meeting, the checked in individuals can be automatically included in the meeting summary and also listed in a suitable user interface so remote participants can identify those in the meeting room. Further, by being checked into the meeting, the individual's laptop or tablet computer can be notified and, in the event the user shares their screen during the meeting, the user's computer can automatically disable its audio/visual to remove feedback that is often the source of unwanted noise during a meeting.

Figure 4:
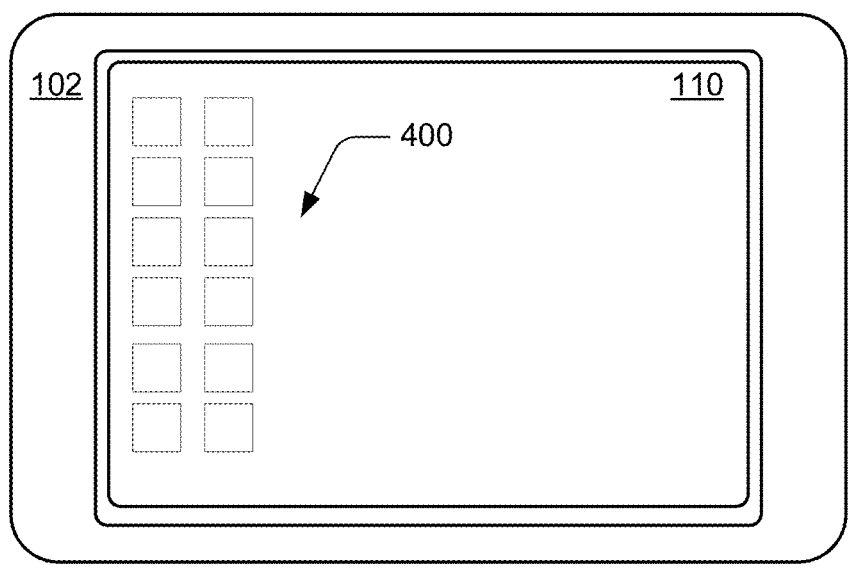
FIG. 4 is an illustration of an example meeting room device in accordance with one or more embodiments.

Users can be checked into a meeting in any suitable way. As an example, consider FIG. 4. There, meeting room device 102 has displayed on its display device 110 a collection of avatars shown generally at 400. Each avatar corresponds to an individual invitee. As users enter a meeting room they can walk up and physically check into the meeting by touch selecting their particular avatar. Users can also check in using other input devices such as a pen, mouse, phone, Bluetooth device or technology and the like. Moreover, users can also check in using various biometric processes including, by way of example and not limitation, fingerprint recognition, iris scans, and the like. Further, users can check into a meeting using, for example, a detectable badge such as an RF badge that can be detected by an RF detector in the meeting room.

In yet other embodiments, individual meeting participants can be automatically checked into a meeting when they enter the meeting room and are recognized by the meeting room device. Specifically, the meeting room device, as noted above, can be equipped with one or more cameras. These cameras can be used to capture images of each participant and, in particular, each participant's face, and use facial recognition technology to check the participant into the meeting. Facial recognition technologies will be known and understood by those of skill in the art and, for the purpose of brevity, are not further described here. Other techniques can be used to automatically identify participants include, by way of example and not limitation, voice recognition (via microphones), a token that is passed from a personal device (such as a phone) to the meeting device. The identification through automatic mechanisms can be guided by knowledge of who was invited to a meeting or knowledge of people who commonly use the meeting device.

Once a particular participant is signed into the meeting, various value-add services and functionality can be provided. Examples of these are mentioned above and include automatic inclusion on a distribution list of individuals who are to receive meeting summaries. Moreover, once automatically checked in to a meeting, the user's laptop or tablet computer can be automatically paired to the meeting room device for purposes of screen sharing, content sharing and the like.

Figure 5:
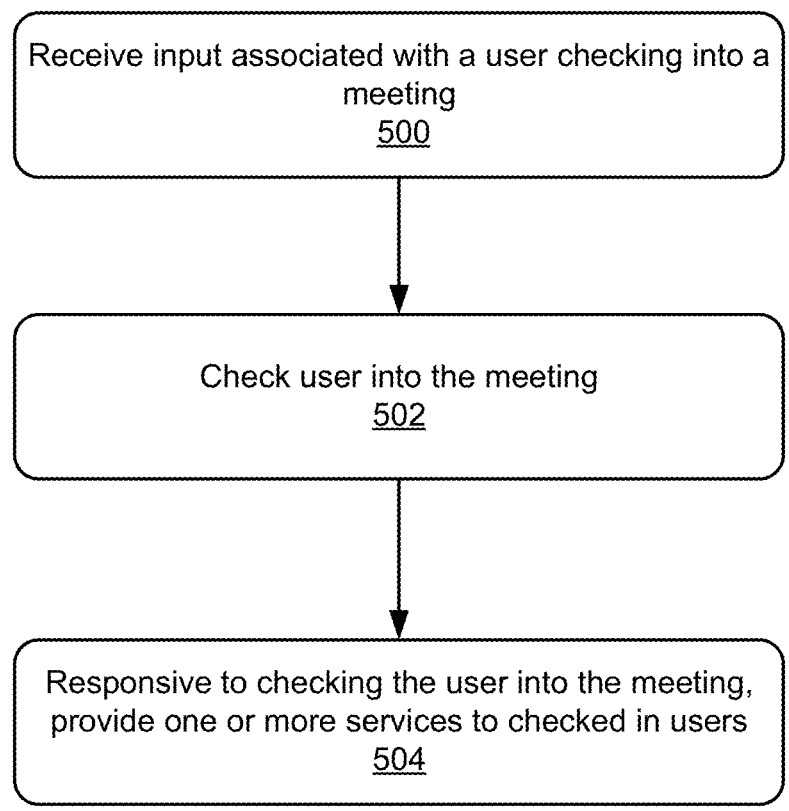
FIG. 5 is a flow diagram that describes steps in a method in accordance with one or more embodiments.

FIG. 5 is a flow diagram that describes steps in a method in accordance with one or more embodiments. The method can be implemented in connection with any suitable hardware, software, firmware, or combination thereof. In at least some embodiments, the method is implemented by a suitably-configured meeting room device executing meeting software.

Step 500 receives input associated with a user checking into a meeting. The step can be performed in any suitable way. For example, in at least some embodiments check-in can be performed through a manual procedure, examples of which are provided above. Alternately or additionally, check-in can be performed through an automatic procedure using any suitable process, examples of which are provided above. Responsive to receiving the input, step 502 checks the user into the meeting. This can include adding the user's name and/or avatar to a list of meeting attendees that individuals can see displayed on the meeting room device. Responsive to checking the user into the meeting, step 504 provides one or more services to checked in users. Services can include, by way of example and not limitation, auto-matically pairing a user's computing device with the meeting room devices, automatically generating a distribution list for meeting summaries for those who have checked into the meeting, automatically generating and sending meeting summaries for those who have checked into the meeting, and the like.

Having considered various aspects of in-room participation, consider now a discussion of how resources can be automatically shared during a meeting.

Automatic Resource Sharing

In the past, during online meetings that include both local and remote participants, sharing resources was performed manually. For example, if one participant wished to share their screen with the entire meeting, they would have to manually interact with their meeting software in order to share their screen. It is not uncommon in these scenarios for participants to forget to manually share their resources. As a consequence, confusion would arise among the participants as to whether or not they should be viewing content that was intended to be shared.

In at least some embodiments, while a meeting is being conducted, at least some resources of the meeting room device are not shared with other participating computing devices until the resources are the subject of an interaction. Once the interaction occurs, the resource is automatically shared with the participating computing devices. This holds true for resources other than those associated with the meeting room device. For example, resources that reside on a participant's computing device can be automatically shared as well. Resource sharing can take place in any suitable way using any suitable protocol. In at least some embodiments, resource sharing can be accomplished using Remote Desktop Protocol (RTP).

Figure 6:
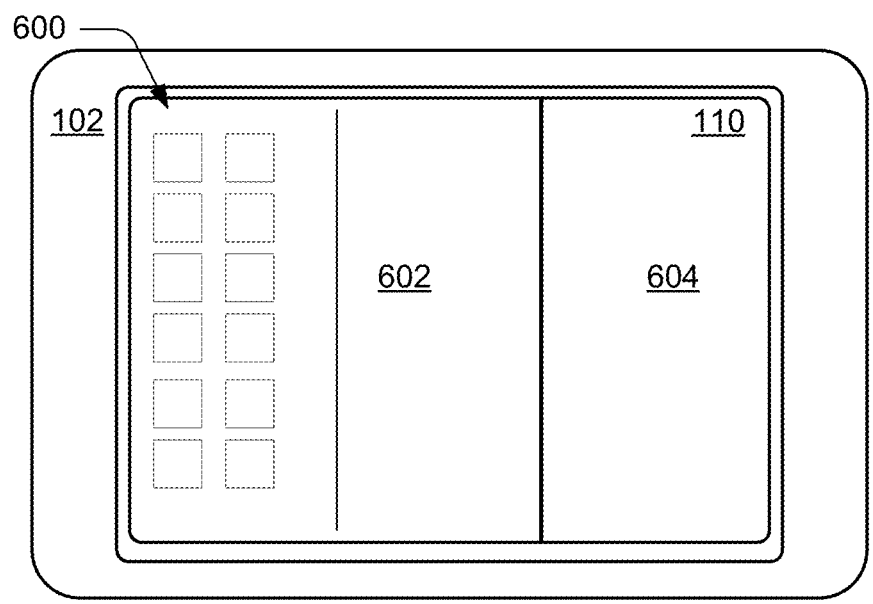
FIG. 6 is an illustration of an example meeting room device in accordance with one or more embodiments.

As an example, consider FIG. 6 which illustrates an example meeting room device 102 having a display device 110. In one or more embodiments, when the meeting is first started the display device 110 includes a portion 600 that represents the meeting or call. That is, portion 600 represents the software that enables the meeting or call to be established. This portion can include, for example, a collection of avatars that represent the meeting participants, as well as other user interface instrumentalities that can be used throughout the meeting. In addition, a display device 110 includes a whiteboard portion 602 that is blank and an application portion 604 in which applications can be opened. In this particular example, application portion 604 includes, at the beginning of the meeting, instructions provided by a content sharing application that provides information to meeting participants in order to enable them to share their computing device's screen to the display device 110. Accordingly, at this point in time in the meeting, there is nothing of interest to share to anyone inside or outside of the room.

Now, as the meeting progresses, certain events will occur that are typically associated with scenarios in which a participant, either at the meeting room device 102 or at their own computing device, would desire to share a meeting resource. Any suitable type of events can be utilized to trigger an automatic resource sharing mode.

As an example, if a user begins to write on the whiteboard portion 602, then an assumption is made that the user would desire to share the whiteboard with the other participants. As such, content that appears on the whiteboard is shared out across the various meeting participants, both local and remote participants. As another example, consider a local, in-room meeting participant who shares their laptop content on the meeting room device's display device 110. In this instance, people in the meeting room can see the content that is being shared on the display device 110 while remote participants may not necessarily be able to view the content. In this example, the meeting room software automatically shares the content on the display device 110 out to the remote participants so that they can view the content on the display device.

As but a third example, another event can include detecting that an application has been launched on the meeting room device or that an application has caused a new window to be opened. For example, the meeting organizer may have opened a spreadsheet application and is entering data into the spreadsheet application. In this instance, an assumption is made that the meeting organizer would prefer to share this content out amongst the other meeting participants. Accordingly, the content on the display device 110 is shared out to the meeting participants which can include both local and remote participants.

In at least some embodiments the meeting software can automatically toggle, in a sense, while in the resource sharing mode, between sharing resources of the meeting room device with the meeting participants, and enabling sharing of resources of the meeting participants with the meeting room device. So, for example, assume that resources are being shared by the meeting room device with meeting participants. Assume now that a remote participant shares some resources with the meeting by way of the meeting room device. At this point, the meeting room device stops sharing resources with the meeting participants and, instead, enables the remote participant to share resources on the meeting room device. When the remote user is finished sharing their resources, the meeting room device automatically toggles back to sharing its resources with the other meeting room participants (assuming that resources were being shared by the meeting room device). Toggling can be triggered in any suitable way such as, by way of example and not limitation, a period of inactivity from the remote user, a manual indication provided by the remote user, and the like.

Resource sharing can also be terminated and triggered by other events as well. For example, if resources are being shared from the meeting room device to the meeting room participants and the meeting software enters a full screen mode associated with the call or video call, resource sharing is terminated. That is, assume that the meeting organizer has a spreadsheet application being shared amongst the meeting participants. For some reason, the meeting organizer shifts the screen to a full screen mode that displays content associated with the video call itself. This might include a display that shows the meeting participants, meeting participant information, and the like. At this point, the full-screen mode associated with the video call itself obscures all the other applications that may have been the subject of sharing. As such, the meeting software terminates resource sharing. When the full-screen mode is exited, resource sharing can be automatically triggered by the meeting software.

In at least some embodiments, a user can opt to share the entire screen of the meeting room device 102. Specifically, in the embodiments described above, both portions 602 and 604 can be shared. Portion 602 corresponds to the whiteboard and portion 604 can correspond to what can be considered as the "application space." The application space is the space in which various applications can be opened and interacted with. Portion 600 is associated with the call or video call itself and is not typically automatically shared. However, there may be some scenarios in which it might be desirable to share portion 600. For example, if the meeting organizer needs to have technical support personnel look into a technical problem, it might be desirable to share the entire screen. In this instance, the user can opt to share not only portions 602 and 604, but portion 600 as well.

Figure 7:
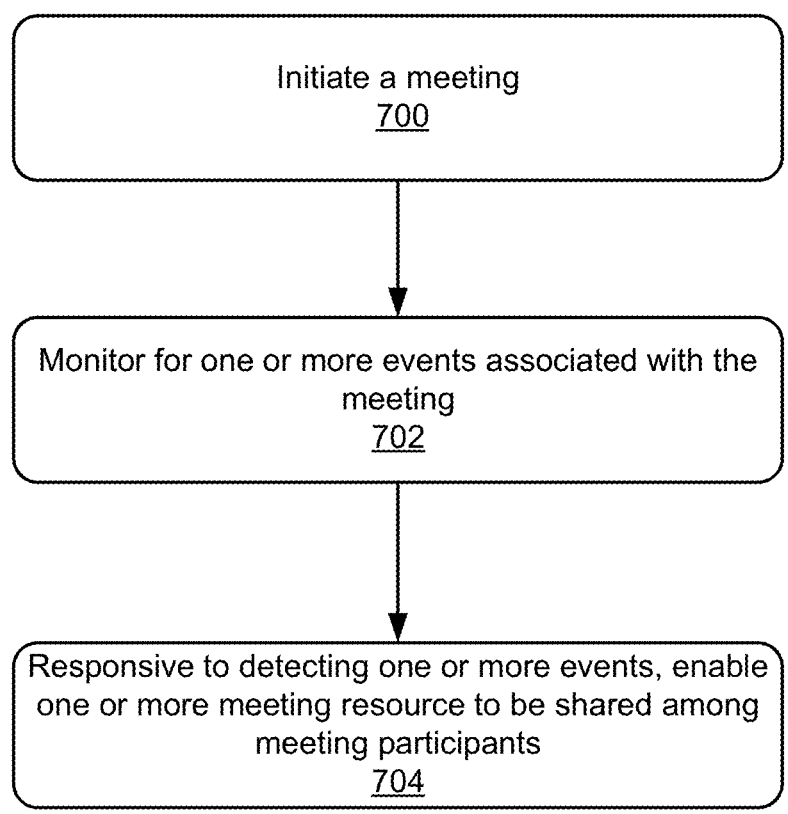
FIG. 7 is a flow diagram that describes steps in a method in accordance with one or more embodiments.

FIG. 7 is a flow diagram that describes steps in a method in accordance with one or more embodiments. The method can be implemented in connection with any suitable hardware, software, firmware, or combination thereof. In at least some embodiments, the method is implemented by a suitably-configured meeting room device executing meeting software.

Step 700 initiates a meeting. This step can be performed in any suitable way, examples of which are provided above. Step 702 monitors for one or more events associated with the meeting. This step can be performed in any suitable way. For example, in at least some embodiments the meeting software can receive calls or notifications from various other system components indicating that a particular event has occurred. Responsive to detecting the event or events, step 704 enables one or more meeting resources to be shared among meeting participants. Any suitable resources can be shared. In at least some embodiments, the meeting room device's screen is shared.

Having considered automatic resource sharing in accordance with one or more embodiments, consider now a discussion of how the meeting room device's cache can be automatically cleared in connection with a meeting.

Meeting Room Device Cache Clearing

As can be appreciated, the meeting room device can very often be used in a somewhat communal setting. For example, an organization may have a meeting room that includes the meeting room device. Different groups within the organization may use the meeting room device to conduct their meetings. These different groups may be unrelated to each other and the subject of the meetings may be quite different. The meeting room device allows content and information to be shared. This information can include sensitive information, confidential information, personal information, and the like. Because of this and because of the communal nature of the environment in which meeting room devices can be employed, it is desirable to protect the content of the meeting once the meeting has concluded. In this manner, other individuals who were not a part of the meeting and may not be authorized to consume such content may not have access to the content.

In at least some embodiments, the meeting room device clears its cache to permanently remove details of the meeting. The details can include, by way of example and not limitation, participant lists, websites visited, notes shared, messages shared, and the like. In at least some embodiments, content associated with the meeting is stored in a restricted number of locations. During or after a particular meeting, these locations are accessed and the content cached therein is permanently deleted so that it is non-recoverable.

The various embodiments can be employed in a number of different scenarios to ensure that information and data appearing in the meeting room device's cache is permanently deleted when the meeting is terminated. The scenarios can include, by way of example and not limitation, when a user explicitly signs out of the meeting to terminate the meeting, when a user is automatically signed out of the meeting, or when the meeting room device is reset.

Figure 8:
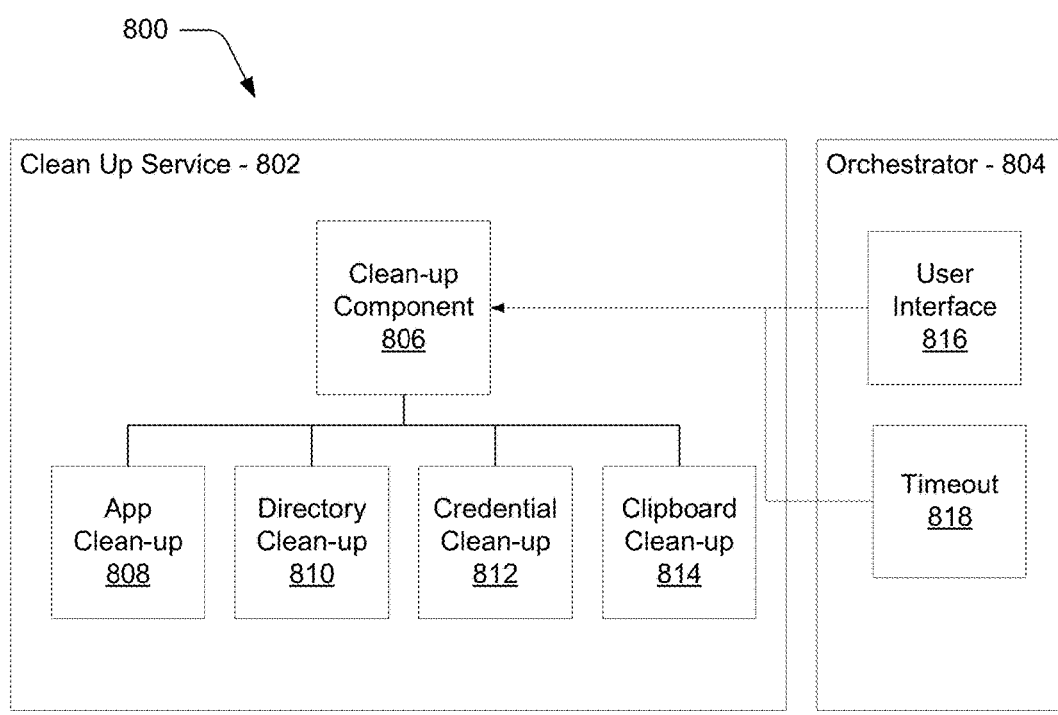
FIG. 8 is an illustration of an example cleanup service in accordance with one or more embodiments.

In at least some embodiments, the meeting software employs a cleanup service to ensure that the restricted number of locations in which data can be stored are processed to permanently delete information that has been cached during the course of the meeting. As but one example of a cleanup service, consider FIG. 8.

There, an example system is shown generally at 800 and includes a cleanup service 802 and a so-called orchestrator 804.

The cleanup service 802 includes a cleanup component 806 that oversees the cache deletion process at the conclusion of the meeting. The cleanup component 806 utilizes individual components to cleanup their respective locations at the conclusion of a meeting. These individual cleanup components include, by way of example and not limitation, an application cleanup component 808, a directory cleanup component 810, a credential cleanup component 812, and a clipboard cleanup component 814.

With respect to the application cleanup component 808, consider the following. Meeting room devices, such as those described above, are designed to enable users to use various applications in connection with a meeting. These applications can typically store information such as state information on the device. For example, during the course of the meeting participant may open up a PowerPoint application, signed into the application and open up a document to collaborate with other meeting participants. Likewise, the user may launch an Internet browser to navigate the web during the course of the meeting. The Internet browser stores browsing history, collects cookies, stores temporary Internet files and the like. In the illustrated and described embodiment, when the meeting is terminated, the application cleanup component 808 iterates through the installed applications and removes data, such as application package data, from locations in which it has been stored. In this manner, the meeting room device is placed into a clean state from session to session.

With respect to directory cleanup component 810, consider the following. During the course of a meeting, data can be stored in various disk locations. These disk locations can be associated with, by way of example and not limitation, the desktop, music, videos, documents, favorites, pictures, and downloads to name just a few. When a meeting is terminated, the directory cleanup component 810 iterates through these various disk locations and permanently deletes content that has been stored therein during the course of the meeting.

With respect to the credential cleanup component 810, consider the following. During the course of the meeting particular users can utilize application authentication to enable access to files and data that might be stored in the cloud. For example, a user may signed into a PowerPoint application using their organizational identification and password to get access to their recent files list and access documents. This credential information is typically stored in a location associated with user credentials. When the meeting is terminated, the credential cleanup component 812 will access this location or work through a broker component to ensure that all user-entered credentials are permanently deleted.

With respect to the clipboard cleanup component 814, consider the following. During the course of the meeting, content may be copied and pasted into various documents. This content is typically stored on the clipboard. When the meeting is terminated, the clipboard cleanup component 814 accesses the clipboard and permanently deletes the data that has been stored on the clipboard during the course of the meeting.

The orchestrator 804 includes a user interface component 816 and a timeout component 818.

The user interface component 816 is configured to enable a user to indicate that a meeting has terminated. Responsive to receiving the indication that the meeting has been terminated, the user interface component 816 notifies the cleanup component 806 which then utilizes the various respective cleanup components discussed above to permanently delete the data at their associated locations.

The timeout component 818 is designed to recognize, based on environmental factors, that a meeting has been terminated. For example, if all of the meeting participants walk out of the room, this can indicate that the meeting has been terminated. As such, the timeout component notifies the cleanup component 806 which then utilizes the various respective cleanup components discussed above to permanently delete the data at their associated locations. Data can be deleted in any suitable way using any suitable techniques. For example, data can be deleted by comparing the meeting room device's state at the beginning of the meeting and at the end of the meeting, and returning the meeting room device to an earlier state.

Figure 9:
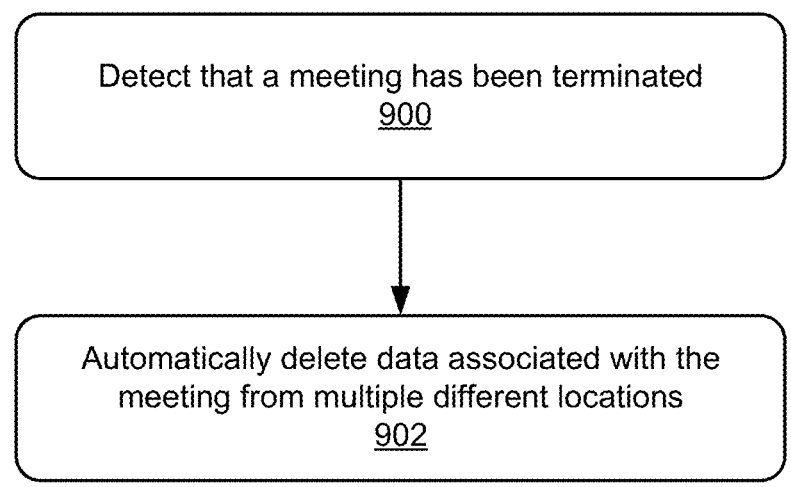
FIG. 9 is a flow diagram that describes steps in a method in accordance with one or more embodiments.

FIG. 9 is a flow diagram that describes steps in a method in accordance with one or more embodiments. The method can be implemented in connection with any suitable hardware, software, firmware, or combination thereof. In at least some embodiments, the method is implemented by a suitably-configured meeting room device executing meeting software.

Step 900 detects that a meeting has been terminated. This step can be performed in any suitable way. For example, in at least some embodiments the step can be performed by receiving input provided by a user that indicates that a meeting has been terminated. Alternately or additionally, this step can be performed by observing, from environmental factors associated with a meeting room in which the meeting is being conducted, that a meeting has been terminated. For example, one or more cameras associated with the meeting room device may capture individuals leaving the meeting room. Responsive to detecting that a meeting has been terminated, step 902 automatically deletes data associated with the meeting from multiple different locations on the meeting room device. Examples of multiple different locations are provided above.

Figure 10:
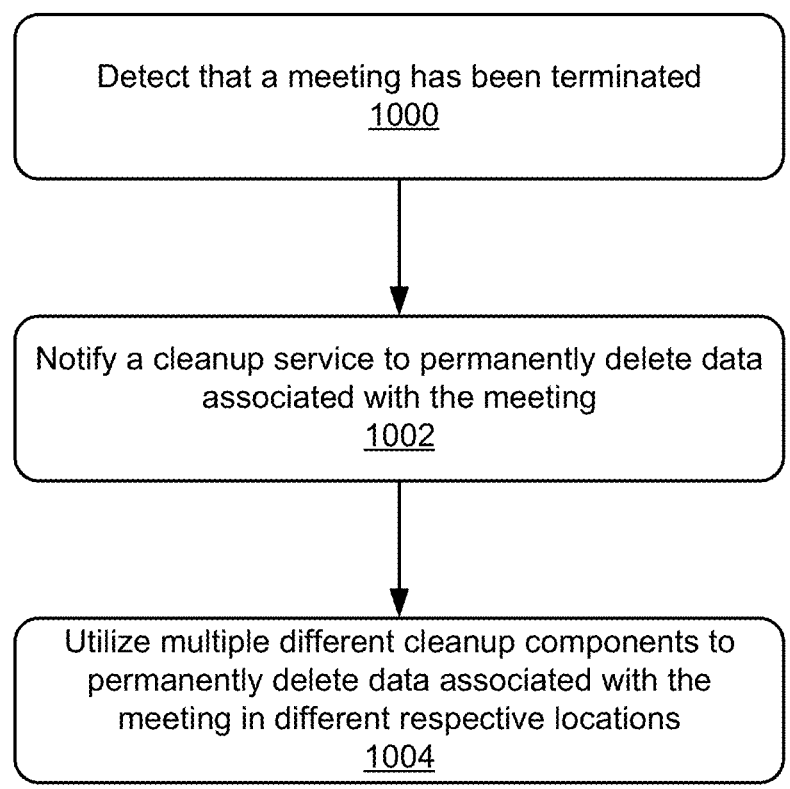
FIG. 10 is a flow diagram that describes steps in a method in accordance with one or more embodiments.

FIG. 10 is a flow diagram that describes steps in a method in accordance with one or more embodiments. The method can be implemented in connection with any suitable hardware, software, firmware, or combination thereof. In at least some embodiments, the method is implemented by a suitably-configured meeting room device executing meeting software.

Step 1000 detects that a meeting has been terminated. Examples of how this can be done are provided above. Step 1002 notifies a cleanup service to permanently delete data associated with the meeting. This step can be performed in any suitable way. For example, in at least some embodiments, the cleanup service can be notified by a user interface component responsive to receiving user input indicating that the meeting has been terminated. Alternately or additionally, the claimant service can be notified by a timeout component indicating that the meeting has been terminated. Responsive to receiving the notification, step 1004 utilizes multiple different cleanup components to permanently delete data associated with the meeting in different respective locations. Examples of different types of cleanup components are provided above.

Having considered meeting room device cache cleanup processes in accordance with one or more embodiments, consider now a discussion of an example meeting room device in accordance with one or more embodiments.

Example Meeting Room Device

Figure 11:
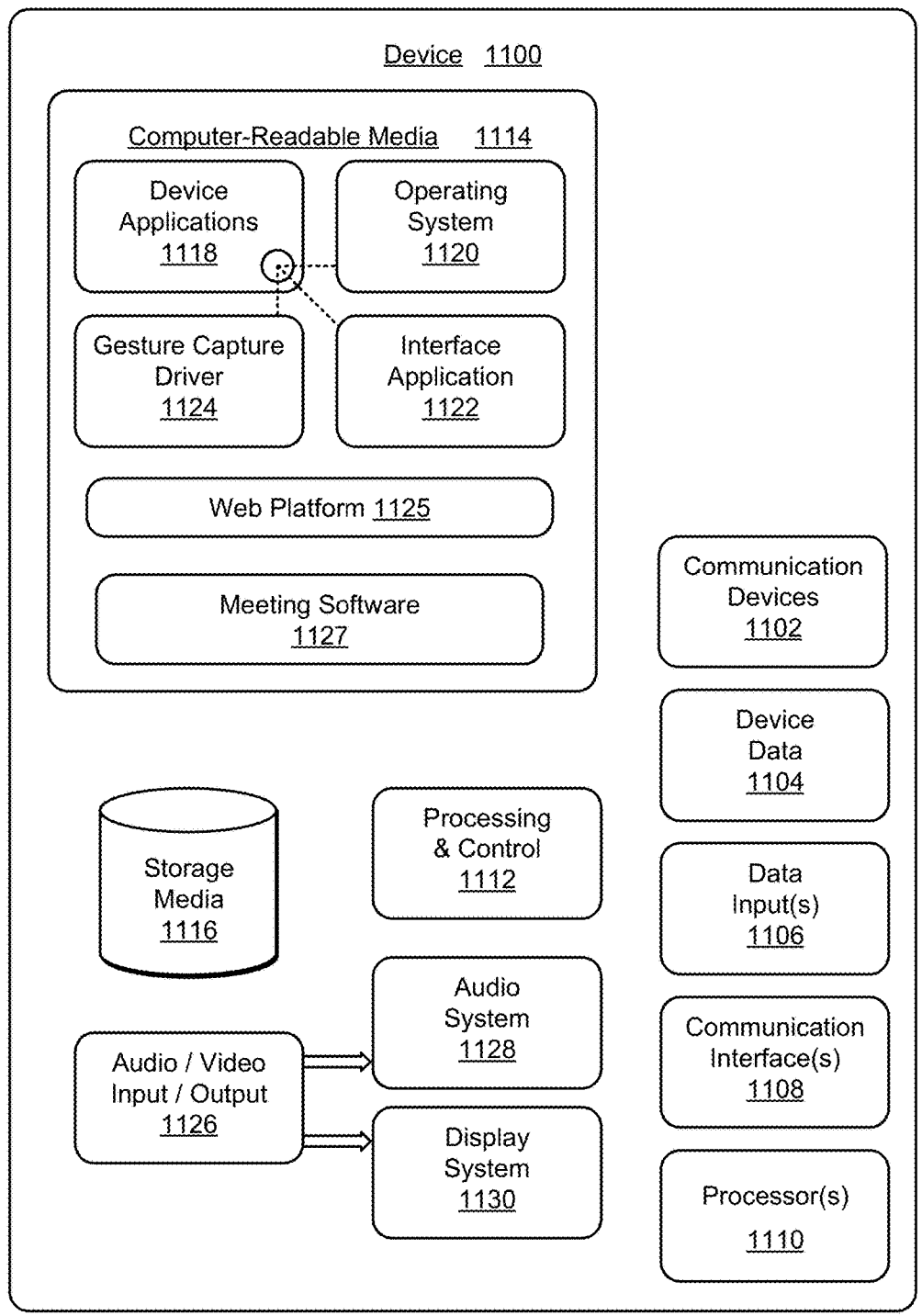
FIG. 11 illustrates an example meeting room device that can be utilized to implement various embodiments described herein.

FIG. 11 illustrates various components of an example meeting room device 1100 that can be implemented as any type of computing device as described with reference to FIGS. 1 and 2 to implement embodiments of the techniques described herein. Device 1100 includes communication devices 1102 that enable wired and/or wireless communication of device data 1104 (e.g., received data, data that is being received, data scheduled for broadcast, data packets of the data, etc.). The device data 1104 or other device content can include configuration settings of the device, media content stored on the device, and/or information associated with a user of the device. Media content stored on device 1100 can include any type of audio, video, and/or image data. Device 1100 includes one or more data inputs 1106 via which any type of data, media content, and/or inputs can be received, such as user-selectable inputs, messages, music, television media content, recorded video content, and any other type of audio, video, and/or image data received from any content and/or data source.

Device 1100 also includes communication interfaces 1108 that can be implemented as any one or more of a serial and/or parallel interface, a wireless interface, any type of network interface, a modem, and as any other type of communication interface. The communication interfaces 1108 provide a connection and/or communication links between device 1100 and a communication network by which other electronic, computing, and communication devices communicate data with device 1100, such as in the context of the meeting.

Device 1100 includes one or more processors 1110 (e.g., any of microprocessors, controllers, and the like) which process various computer-executable instructions to control the operation of device 1100 and to implement embodiments of the techniques described herein. Alternatively or in addition, device 1100 can be implemented with any one or combination of hardware, firmware, or fixed logic circuitry that is implemented in connection with processing and control circuits which are generally identified at 1112. Although not shown, device 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1100 also includes computer-readable media 1114, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1100 can also include a mass storage media device 1116.

Computer-readable media 1114 provides data storage mechanisms to store the device data 1104, as well as various device applications 1118 and any other types of information and/or data related to operational aspects of device 1100. For example, an operating system 1120 can be maintained as a computer application with the computer-readable media 1114 and executed on processors 1110. The device applications 1118 can include a device manager (e.g., a control application, software application, signal processing and control module, code that is native to a particular device, a hardware abstraction layer for a particular device, etc.). The device applications 1118 also include any system components or modules to implement embodiments of the techniques described herein. In this example, the device applications 1118 include an interface application 1122 and a gesture capture driver 1124 that are shown as software modules and/or computer applications. The gesture capture driver 1124 is representative of software that is used to provide an interface with a device configured to capture a gesture, such as a touchscreen, track pad, camera, and so on. Alternatively or in addition, the interface application 1122 and the gesture capture driver 1124 can be implemented as hardware, software, firmware, or any combination thereof. Additionally, computer readable media 1114 can include a web platform 1125 and meeting software 1027 that functions as described above.

Device 1100 also includes an audio and/or video input-output system 1126 that provides audio data to an audio system 1128 and/or provides video data to a display system 1130. The audio system 1128 and/or the display system 1130 can include any devices that process, display, and/or otherwise render audio, video, and image data. Video signals and audio signals can be communicated from device 1100 to an audio device and/or to a display device via an RF (radio frequency) link, S-video link, composite video link, component video link, DVI (digital video interface), analog audio connection, or other similar communication link. In an embodiment, the audio system 1128 and/or the display system 1130 are implemented as external components to device 1100. Alternatively, the audio system 1128 and/or the display system 1130 are implemented as integrated components of example device 1100.

Example Implementations

Example implementations employing a meeting summary described herein include, but are not limited to, one or any combination of one or more of the following example:

A computer-implemented method comprising: detecting, using a meeting room device, that a meeting has been terminated; responsive to detecting that the meeting has been terminated, automatically deleting data associated with the meeting from multiple different locations.

The method as described above, wherein said detecting is performed by receiving input provided by a user that indicates that a meeting has been terminated.

The method as described above, wherein said detecting is performed by observing, from environmental factors associated with the meeting room in which the meeting is being conducted, that a meeting has been terminated.

The method as described above, wherein said observing is performed by using one or more cameras to capture individuals leaving the meeting room.

The method as described above, wherein one of the locations corresponds to application data associated with applications that were used during the meeting.

The method as described above, wherein one of the locations corresponds to directory locations.

The method as described above, wherein one of the locations corresponds to credential information associated with user credentials.

The method as described above, wherein one of the locations corresponds to content that was copied and pasted during the meeting.

A system comprising: one or more processors; one or more computer readable media; meeting software embodied on the one or more computer readable media and executable by the one or more processors to perform operations comprising: detecting, using a meeting room device, that a meeting has been terminated; responsive to detecting that the meeting has been terminated, automatically deleting data associated with the meeting from multiple different locations.

The system as described above, wherein said detecting is performed by receiving input provided by a user that indicates that a meeting has been terminated.

The system as described above, wherein said detecting is performed by observing, from environmental factors associated with the meeting room in which the meeting is being conducted, that a meeting has been terminated.

The system as described above, wherein said observing is performed by using one or more cameras to capture individuals leaving the meeting room.

The system as described above, wherein one of the locations corresponds to application data associated with applications that were used during the meeting.

The system as described above, wherein one of the locations corresponds to directory locations.

The system as described above, wherein one of the locations corresponds to credential information associated with user credentials.

The system as described above, wherein one of the locations corresponds to content that was copied and pasted during the meeting.

A meeting room device comprising: one or more processors; one or more computer readable media embodying: a cleanup service including a cleanup component that oversees an automatic deletion process at the conclusion of a meeting; and multiple other cleanup components each of which are configured to permanently delete meeting information in different respective locations at the conclusion of the meeting.

The meeting room device as described above, wherein one of the multiple other cleanup components comprises an application cleanup component configured to delete application data associated with applications that were utilized during the meeting.

The meeting room device as described above, wherein one of the multiple other cleanup components comprises a directory cleanup component configured to delete data in the directory corresponding to information that is utilized during the meeting.

The meeting room device as described above, wherein one of the multiple other cleanup components comprises a credential cleanup component that is configured to delete credential data corresponding to user credentials that utilized during the meeting.

Conclusion

In at least some embodiments, meeting software on a meeting room device enables a meeting summary to be generated and sent to individuals associated with a meeting. The meeting summary may be triggered by a user, such as a meeting administrator. Alternately or additionally, the meeting summary may be automatically triggered and sent to the individuals associated with the meeting. In at least some embodiments, the meeting summary can include a timeline of events that occurred throughout the meeting. In addition, the meeting summary can include content from the meeting and/or mechanisms to enable content from the meeting to be accessed by the recipients of the meeting summary.

In at least some embodiments, the meeting summary can be provided at the end of the meeting. Various options can enable the meeting summary to be sent to different groups of individuals. These groups can include, by way of example and not limitation, all invited participants or checked-in participants. In addition, various techniques can be utilized to identify local meeting participants. These techniques can include, by way of example and not limitation, facial detection, detectable badges, and the like.

In yet other embodiments, the meeting room device clears its cache to permanently remove details of the meeting. The details can include, by way of example and not limitation, participant lists, websites visited, notes shared, messages shared, and the like. In at least some embodiments, content associated with the meeting is stored in a restricted number of locations. During or after a particular meeting, these locations are accessed and the content cached therein is permanently deleted so that it is non-recoverable.

In at least some embodiments, while a meeting is being conducted, at least some resources of the meeting room device are not shared with other participating computing devices until the resources are the subject of an interaction. Once the interaction occurs, and the resource is automatically shared with the participating computing devices.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
   detecting, using a meeting room device, that a meeting has been terminated;
   responsive to detecting that the meeting has been terminated, automatically deleting data associated with the meeting from multiple different locations;
   the automatically deleting comprising:
      accessing application data associated with applications that were used during the meeting from a first one of the multiple different locations, and deleting the application data from the first location;
      accessing, from a second one of the multiple different locations, data associated with the meeting, and deleting the data associated with the meeting from the second location, the second location comprising a directory location;
      accessing, from a third one of the multiple different locations, user credentials that were utilized by one or more meeting participants to obtain access to files and data during the meeting, and deleting credential information associated with the user credentials from the third location; and
      accessing, from a fourth one of the multiple different locations, content that was copied to a clipboard during the meeting as a result of a copy and paste operation, and deleting the content that was copied to the clipboard during the meeting as a result of a copy and paste operation from the fourth location.

2. The method of claim 1, wherein said detecting is performed by receiving input provided by a user that indicates that a meeting has been terminated.

3. The method of claim 1, wherein said detecting is performed by observing, from environmental factors associated with the meeting room in which the meeting is being conducted, that a meeting has been terminated.

4. The method of claim 3, wherein said observing is performed by using one or more cameras to capture individuals leaving the meeting room.

5. The method of claim 1, wherein an individual application cleanup component is configured to delete the application data associated with applications that were used during the meeting.

6. The method of claim 1, wherein an individual directory cleanup component is configured to delete data associated with the meeting from the one or more directory locations.

7. The method of claim 1, wherein an individual credential cleanup component is configured to delete the credential information associated with user credentials.

8. The method of claim 1, wherein an individual clipboard cleanup component is configured to delete the content that was copied and pasted during the meeting.

9. A system comprising:
one or more processors;
one or more computer readable storage media;
meeting software embodied on the one or more computer readable media and executable by the one or more processors to perform operations comprising:
detecting, using a meeting room device, that a meeting has been terminated; and
responsive to detecting that the meeting has been terminated, automatically deleting data associated with the meeting from multiple different locations, the automatically deleting comprising:
deleting, from one of the multiple different locations, application data associated with applications that were used during the meeting;
deleting, from one of the multiple different locations, data associated with the meeting stored in one or more directory locations;
accessing user credentials that were utilized by one or more meeting participants to obtain access to files and data during the meeting, and deleting, from one of the multiple different locations, credential information associated with the user credentials; and
accessing a clipboard and deleting, from one of the multiple different locations, content that was copied to the clipboard during the meeting.

10. The system of claim 9, wherein said detecting is performed by receiving input provided by a user that indicates that a meeting has been terminated.

11. The system of claim 9, wherein said detecting is performed by observing, from environmental factors associated with the meeting room in which the meeting is being conducted, that a meeting has been terminated.

12. The system of claim 11, wherein said observing is performed by using one or more cameras to capture individuals leaving the meeting room.

13. The system of claim 9, wherein the meeting software comprises an individual application cleanup component configured to delete the application data associated with applications that were used during the meeting.

14. The system of claim 9, wherein the meeting software comprises an individual directory cleanup component configured to delete data associated with the meeting from the one or more directory locations.

15. The system of claim 9, wherein the meeting software comprises an individual credential cleanup component configured to delete the credential information associated with user credentials.

16. The system of claim 9, wherein the meeting software comprises an individual clipboard cleanup component configured to delete the content that was copied to the clipboard during the meeting.

17. A meeting room device comprising:
one or more processors;
one or more computer readable storage media embodying:
a cleanup service including a cleanup component that oversees an automatic deletion process at the conclusion of a meeting; and
multiple other cleanup components each of which are configured to permanently delete meeting information in different respective locations at the conclusion of the meeting, the multiple other cleanup components comprising:
an application cleanup component to delete, from one of the different respective locations, application data associated with applications that were utilized during the meeting;
a directory cleanup component to delete, from one of the different respective locations, data in the directory corresponding to information that is utilized during the meeting;
a credential cleanup component to access user credentials that were utilized by one or more meeting participants to obtain access to files and data during the meeting, and delete, from one of the different respective locations, credential data corresponding to the user credentials that were utilized during the meeting; and
a clipboard cleanup component to access a clipboard and delete, from one of the different respective locations, content that was copied to the clipboard during the meeting as a result of a copy and paste operation.

18. The meeting room device of claim 17, wherein the multiple other cleanup components comprises at least the application cleanup component and the directory cleanup component.

19. The meeting room device of claim 17, wherein the multiple other cleanup components comprise at least the directory cleanup component and the credential cleanup component.

20. The meeting room device of claim 17, wherein the multiple other cleanup components comprise at least the application cleanup component and the credential cleanup component.

* * * * *